(12) United States Patent
Jagle et al.

(10) Patent No.: US 9,149,810 B2
(45) Date of Patent: Oct. 6, 2015

(54) DEVICE FOR COMMINUTING OR GRINDING

(75) Inventors: Peter Jagle, Ballrechten-Dottingen (DE); Henry Bierhals, Freiburg (DE)

(73) Assignee: IKA—Werke GmbH & Co. KG, Staufen (DE)

( * ) Notice: Subject to any disclaimer, the term of this patent is extended or adjusted under 35 U.S.C. 154(b) by 551 days.

(21) Appl. No.: 13/510,133

(22) PCT Filed: Oct. 30, 2010

(86) PCT No.: PCT/EP2010/006650
§ 371 (c)(1),
(2), (4) Date: May 16, 2012

(87) PCT Pub. No.: WO2011/060882
PCT Pub. Date: May 26, 2011

(65) Prior Publication Data
US 2012/0228415 A1    Sep. 13, 2012

(30) Foreign Application Priority Data

Nov. 21, 2009  (DE) .......................... 10 2009 054 215

(51) Int. Cl.
| | | |
|---|---|---|
| B02C 18/18 | (2006.01) | |
| B02C 18/12 | (2006.01) | |
| A47J 43/08 | (2006.01) | |
| A47J 43/046 | (2006.01) | |
| A47J 43/12 | (2006.01) | |

(52) U.S. Cl.
CPC .............. *B02C 18/12* (2013.01); *A47J 43/046* (2013.01); *A47J 43/08* (2013.01); *A47J 43/085* (2013.01); *A47J 43/12* (2013.01)

(58) Field of Classification Search
CPC ......... A47J 43/085; A47J 43/12; A47J 43/04; A47J 43/046; A47J 43/08
USPC ................................. 241/282.1, 282.2, 285.2
See application file for complete search history.

(56) References Cited

U.S. PATENT DOCUMENTS

| | | | | |
|---|---|---|---|---|
| 2,930,596 | A * | 3/1960 | Waters | ........................... 366/279 |
| 2,982,483 | A * | 5/1961 | Egber | ............................ 241/100 |
| 3,612,414 | A | 10/1971 | Nevison et al. | |
| 3,785,579 | A | 1/1974 | Voglesonger | |
| 4,469,283 | A * | 9/1984 | Noguchi et al. | ................. 241/48 |
| 4,887,909 | A * | 12/1989 | Bennett | ......................... 366/199 |

(Continued)

FOREIGN PATENT DOCUMENTS

| | | |
|---|---|---|
| DE | 19650441 | 6/1998 |
| GB | 810485 | 3/1959 |
| JP | 55152557 | 11/1980 |
| JP | S6113028 | 1/1986 |
| JP | 62121656 | 6/1987 |

(Continued)

*Primary Examiner* — Faye Francis
(74) *Attorney, Agent, or Firm* — Volpe and Koenig, P.C.

(57) ABSTRACT

A device (1) for comminuting or grinding including a container (2) for receiving the material to be ground and a tool (5) which rotates in the container (2) during processing, and a drive for said tool (5). The container (2) having the tool (5) can be detachably coupled to the drive, which is to say that the container (2) having the tool (5) does not have to be cleaned after a grinding operation but can be replaced by a new such container (2). For this purpose, the tool (5) located in the container (2) can be rotated loosely when in the position of being detached or uncoupled from the drive or before a corresponding coupling operation and, when in the working position, is rotationally fixedly connected to the drive and centered by the coupling.

16 Claims, 4 Drawing Sheets

(56) References Cited

U.S. PATENT DOCUMENTS

| | | | |
|---|---|---|---|
| 5,636,923 A | 6/1997 | Nejat-Bina | |
| 6,824,087 B2 * | 11/2004 | McPherson et al. | 241/30 |
| 7,131,605 B2 * | 11/2006 | McPherson et al. | 241/199.12 |
| 8,002,774 B2 * | 8/2011 | Burmeister et al. | 606/79 |

FOREIGN PATENT DOCUMENTS

| | | |
|---|---|---|
| JP | H02269376 | 11/1990 |
| JP | 10179427 | 7/1998 |
| JP | 2003326229 | 11/2003 |
| JP | 2007140328 | 6/2007 |

* cited by examiner

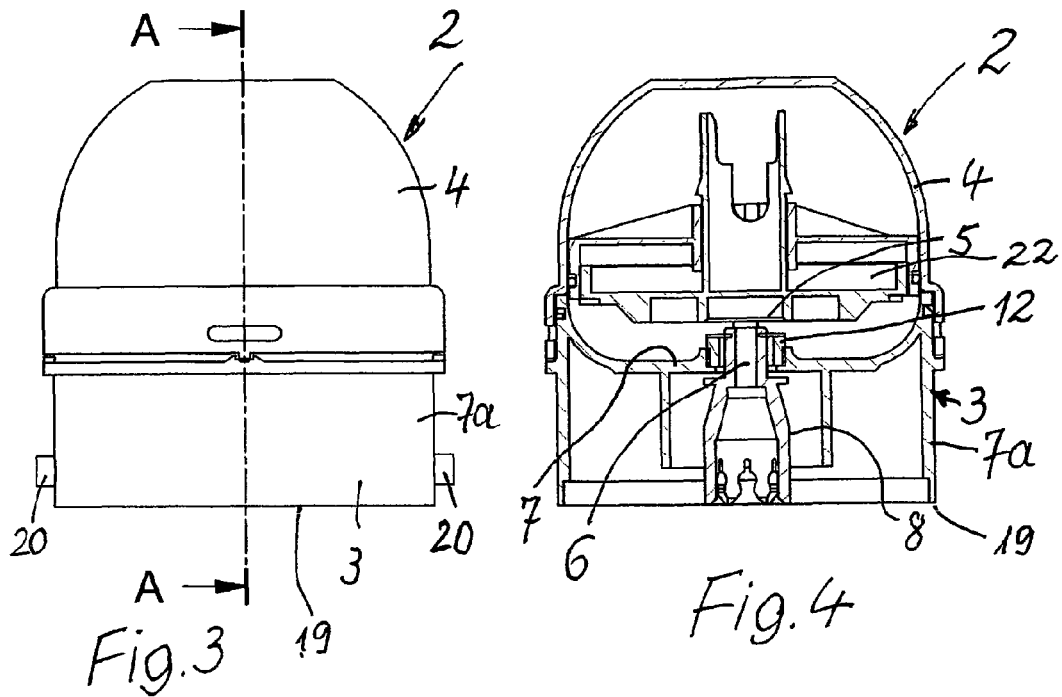
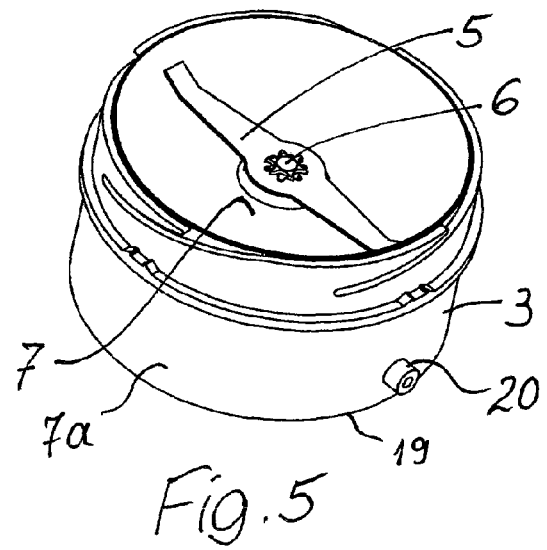

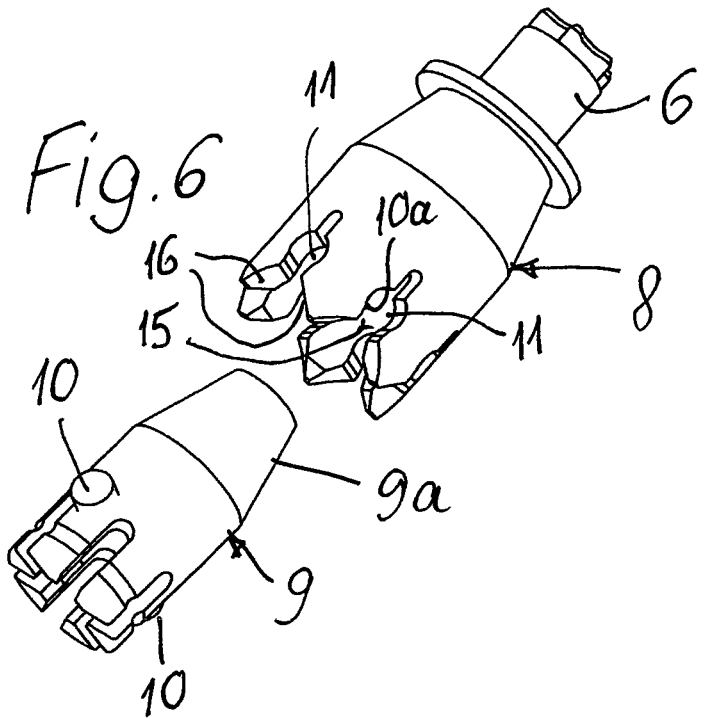
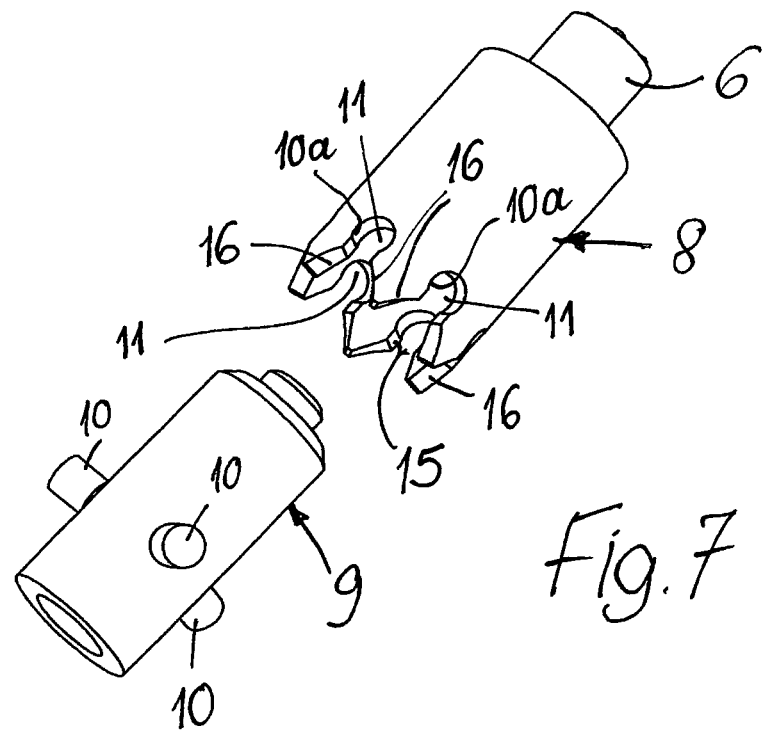

DEVICE FOR COMMINUTING OR GRINDING

BACKGROUND

The invention relates to a device for comminuting or grinding material to be ground, in particular hard, brittle or embrittled particles or substances, comprising a container for receiving the material to be ground and comprising a tool which rotates in this container during the comminuting or grinding and also comprising a drive for this tool.

Devices of this type, for example mills, are known especially in the area of performing analyses and serve the purpose of comminuting specific materials to be ground for the analyzing process. In the case of the known devices of this type or mills, the receiving container is connected to a housing for the drive in such a way that, after a comminuting or grinding operation, the container and the tool located therein have to be carefully cleaned in order to be available for further grinding or comminuting operations. Especially in the case of contaminated or toxic substances, this may be very laborious and under some circumstances not completely successful, because sometimes parts of such substances get into seals for separating the content of the container from the drive, located in particular in the region of the tool, or because it is only with difficulty that such regions can be accessed for the cleaning itself. A correspondingly great loss of time occurs between two comminuting or grinding operations to be carried out successively, in particular because of this cleaning.

SUMMARY

The object is therefore to provide a device of the type mentioned at the beginning with which grinding operations can be carried out successively at shorter time intervals.

To achieve this object, the device defined at the beginning is characterized in that the container with the tool can together be detachably coupled to the drive and in that the tool is arranged in the container in a position detached or decoupled from the container and/or loosely rotatable and, in the position for use, is connected by the coupling to the drive for rotation therewith and centered.

Such an arrangement makes it possible to design the container and the tool very inexpensively, especially since the tool does not have to be mounted with respect to the container. Rather, the centering of the tool and also that of the container only takes place when they are coupled to the drive, so that it is also possible without any problem to dispose of this container with the tool and replace it by a new container with a tool after it has been used only once, obviating the need for cleaning. The time gained from this is generally of more value than the disposable container, which can therefore be exchanged for such a container with a tool. Furthermore, there is the advantage that there is no need for cleaning, which, especially in the case of toxic or contaminated substances, can also be regarded as advantageous for users.

However, it is also possible to detach the container with the tool after a processing operation and replace it immediately by another such container with a tool, so that the used container can be cleaned at leisure. It is therefore part of the invention that the container with the tool can be exchanged either for a new container or for a container that has been cleaned.

It is expedient if a shaft acting on the tool passes to the outside or downward through the bottom or a wall of the container and has or carries a coupling extension which can be fitted together in a centering and non-positively and/or positively engaging manner with a counter coupling piece arranged on the drive for rotation therewith. Consequently, the detaching or connecting of the container and the tool to the drive can be carried out quickly and easily.

The coupling extension and the counter coupling piece may at least in certain regions be formed in a cylindrical manner and, adjacent thereto, in a tapering or conical manner in such a way that, in the position for use, the outer cone and the inner cone on the one hand and the cylindrical regions on the other hand contact one another, at least over part of their circumference. This produces good and dependable centering when they are fitted together.

The coupling extension on the shaft of the tool may be formed as a hollow cylinder which is open on its end face remote from the tool and tapers toward the shaft, and the counter coupling piece may have a cone piece which fits the tapering or the cone in the coupling extension and is arranged coaxially on a cylindrical region of a cross section that corresponds approximately to the greatest cross section of the conical region. In the fitted-together state, the cone regions provide the centering and, in a way still to be described, the cylindrical regions provide not only stabilization but also the transfer of retaining and turning forces.

An expedient embodiment may provide that the coupling extension and the coupling counter piece can be locked in the axial direction by means of outwardly or radially protruding projections and matching clearances that are open in the axial direction and have undercuts and that the clearance intended for locking with the respective projection is arranged at a point of the coupling at which the coupling extension and the coupling counter piece are held together under a reciprocal axial force and the bottom or wall region of the container that is adjacent the coupling extension is pressed against a seal enclosing the shaft. Therefore, on the one hand the projections that can be locked with undercuts help to bring about a torque transfer and on the other hand the locking operation in the axial direction also has the effect of exerting a force by which the coupling is drawn together and held together and possibly a seal in the region of the shaft is pressed together. Therefore, a simple and quick inserting movement makes the required centering and sealing measures come into effect and the drive can subsequently transfer the torque to the then clamped and fixed tool. Nevertheless, detachment is also easy, because the coupled parts only have to be pulled apart while overcoming the locking force, for which a tool may also be used if necessary.

An expedient embodiment, in particular of the coupling region, may in this case provide that the counter coupling piece has at least two radially protruding projections of a preferably round cross section and the coupling extension has slits which widen in the direction of insertion, the widening having dimensions that correspond approximately to a projection, and a constriction that can be overcome in a locking manner being arranged ahead of the projection in the direction of insertion. During fitting together, the constriction must therefore be pushed over the projection or in relation to it, which is possible if there is a certain displacement or elastic yielding of the material, until the respective projection engages in the widening of the coupling opening. In this respect, the preferred arrangement is for the projections to be provided on the counter coupling piece, but conversely the counter coupling piece could also have the locking slits and the coupling extension could have the projections.

The clearances on the coupling extension may have run-in slopes, which lead to the constrictions. This further facilitates fitting together, because the user does not have to bring the projections and the slits receiving them exactly into alignment, but instead the run-in slopes bring the projections into the correct relative orientation during fitting together.

For coupling parts having a cone and a tapering inner opening, two radially protruding projections may be provided on the counter coupling piece—or optionally on the coupling extension. Together with the conical contact regions, this provides static determinacy of this coupling.

A modified embodiment may provide that the coupling extension and the counter coupling piece fit together over their entire effective length with constant cross sections and three radially protruding projections can be locked with slits and openings during fitting together. This also provides static determinacy.

It is favorable if the drive is arranged—protected—in a housing and the container and this housing can be detachably connected, the detaching and connecting movement also serving for detaching or connecting the coupling.

The connection of the container and the housing may be made up of a first axial inserting movement and a turning movement, taking place at least over an angular region, and the inserting movement may be synchronous with the fitting together of the coupling extension with the counter coupling piece. Consequently, the user only needs to fit the container together with the housing of the drive in the intended way to have already coupled and connected the drive and the tool.

A bayonet closure may be provided for the connection between the container and the housing. In the case of a bayonet closure, initially axial movement is required for the closing movement, which is the mentioned inserting movement, after which a relative partial turning also takes place. On the container there may be arranged adjacent to a rim that is at the bottom in the position for use at least one radially protruding projection, matching the retaining curve of the bayonet closure, and the retaining curve on the housing of the drive may have a vertical entry point and a portion extending particularly in a sloping manner in the circumferential direction. For better fastening, two such projections may interact with two retaining curves preferably lying opposite each other on the circumference.

The slope of the retaining curve of the bayonet closure may run over a circumferential region and thereby over a region of the height that corresponds at least partly to the engaging movement of the coupling extension. Therefore, the coupling of the shaft and the drive may already partly take place during the fitting together and be completed by the turning of the bayonet closure. At the same time, as a result, the entire coupling is also secured against unwanted detachment. Therefore, appropriate design of the bayonet closure can achieve the effect that the coupling and locking of the coupling extension and the counter coupling piece take place virtually automatically by actuating this bayonet closure.

In the region of the passage through the shaft for the tool, a sealing ring enclosing and acting on this passage may be provided as a seal, which sealing ring can be acted upon in the axial direction and/or pressed together when connecting the container to the housing of the drive, in particular by the tool, so that in this position it then also has a good sealing effect. The corresponding deformation of the sealing ring thereby takes place virtually automatically by the joining together of the coupling extension and the counter coupling piece and the axial force brought about thereby.

The sealing ring may, for example, consist at least partly of foam material and be formed in a low-friction manner on at least one end face or on the end face toward the tool, for example by coating or flocking. Consequently, the relative movement in relation to the rotating tool is impaired as little as possible.

It should also be mentioned that in the preferably exchangeable container there may be provided above the space receiving the material to be ground and having the tool a plate which bounds the interior space of the container, in the starting position rests on the material to be ground and makes it possible or easier to adapt the interior space to the amount of material to be ground. At the same time, a stop may be provided for the plate located over or on the material to be ground, limiting the extent to which said plate sinks down in order to prevent any possibility of collision with the tool. The plate can therefore automatically reduce the size of the grinding space during the grinding operation and the reduction in the volume consequently taking place simultaneously.

The side of the plate toward the material to be ground may have profilings or roughenings or similar deformations to assist the grinding or comminuting operation. The material to be ground is then expediently acted upon by the tool but also correspondingly by the rough side of the plate.

Especially a combination of one or more of the features and measures described above provides a device according to the invention for comminuting or grinding in which the cleaning effort can be reduced or even avoided, in that the container with the tool can be separated from the drive and can be exchanged, so that it can either be disposed of already after one processing operation as an inexpensive single-use container or exchanged for a fresh or cleaned container after a processing operation and then thoroughly prepared for the next grinding operation.

BRIEF DESCRIPTION OF THE DRAWINGS

An exemplary embodiment of the invention is described in more detail below on the basis of the partly schematic drawing, in which:

FIG. 3 shows a side view of the detachably mountable container, FIG. 4 shows a longitudinal section of the container along the line A-A in FIG. 3 with a coupling extension arranged on the shaft for the tool, FIG. 5 shows a diagrammatic representation of the container without its cover, which can be screwed on or mounted using a bayonet closure, FIG. 6 shows in a diagrammatic representation the coupling extension of the device according to FIG. 4 and the matching coupling counter piece according to FIGS. 1 and 2, FIG. 7 shows a modified embodiment of the coupling extension and the counter coupling piece.

DETAILED DESCRIPTION OF THE PREFERRED EMBODIMENTS

A device denoted as a whole by 1 serves for comminuting or grinding material to be ground, for example hard, brittle or embrittled particles and substances intended to be sent on for precise analysis.

Figure 1:
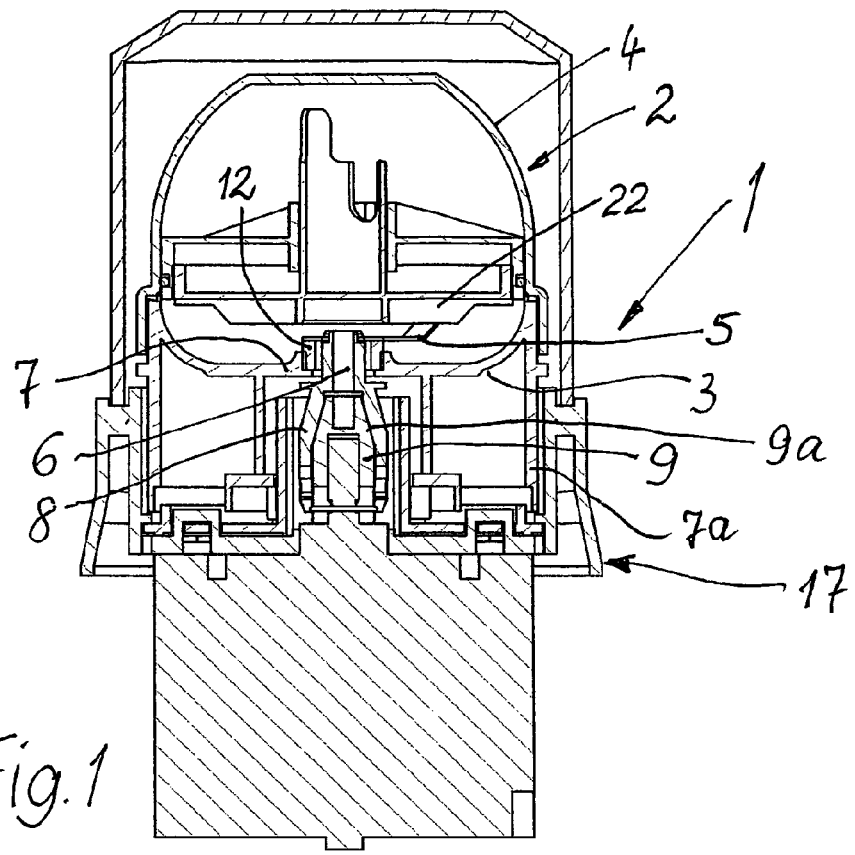
FIG. 1 shows in longitudinal section a device according to the invention for comminuting or grinding material to be ground, comprising a container with a tool which can be detachably coupled to a drive.
Figure 8:
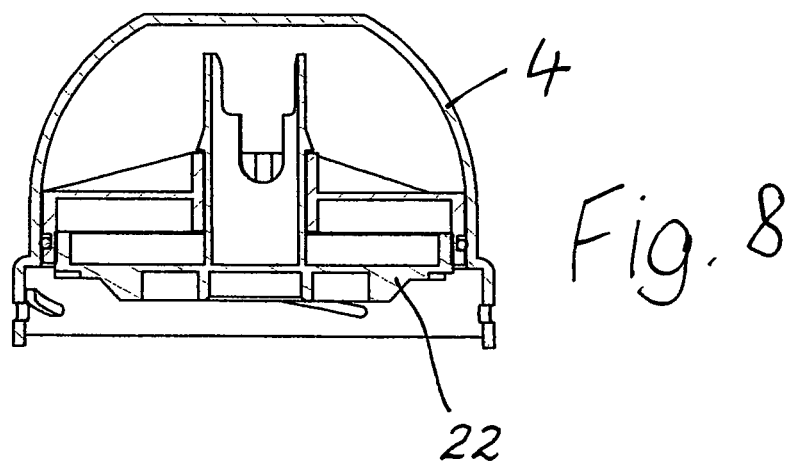
FIG. 8 shows a longitudinal section through the detachable cover of the container, which matches the lower part represented in FIG. 5.

The device 1 includes a container 2, represented in FIGS. 1, 3 and 4, for receiving the material to be ground, this container being made up in the position for use according to FIGS. 5 and 8 of a lower part 3 and a cover 4 in the form of a hood that can be connected or is connected to said lower part.

Arranged in the container 2 is a tool 5, which rotates during the comminuting or grinding and arranged under which in the position for use according to FIGS. 1 and 4 is a shaft 6 for coupling the tool 5 to a drive.

Especially when FIGS. 1, 2, 3 and 4 are considered at the same time, it becomes clear that the container 2 with the tool 5 can be coupled together with the drive still to be explained below, whereby the tool 5 is set in rotation, and that the tool 5 is loosely rotatable in the container 2 in a position detached or decoupled from the drive and only in the position for use is connected by the coupling to the drive for rotation therewith and centered.

Especially FIGS. 4 and 5 make it clear that the tool 5 is loosely rotatable in the container 2 as long as there is no connection with a drive.

The shaft 6 acting on the tool 5 passes in the exemplary embodiment to the outside through the bottom 7 of the container 2 and in the exemplary embodiment downward in the position for use. An arrangement in which the shaft passes to the outside through a wall would also be conceivable.

The shaft 6 carries a coupling extension, which is denoted as a whole by 8 and can be fitted together in a centering and non-positively and positively engaging manner with a counter coupling piece 9 arranged on the drive for rotation therewith (cf. FIGS. 1, 2, 6 and 7).

In FIGS. 6 and 7, a coupling extension 8 and a counter coupling piece 9 of somewhat different shaping are respectively represented shortly before they are fitted together.

In the case of the exemplary embodiment according to FIGS. 1, 2, 4 and 6, the coupling extension 8 and the counter coupling piece 9 are in certain regions formed in a cylindrical manner and, adjacent thereto, in a conically tapering manner in such a way that, in the position for use according to FIG. 1, the outer cone and the inner cone on the one hand and the cylindrical regions on the other hand contact one another at the circumference and thus form a positively engaging coupling.

It can be seen here that the coupling extension 8 on the shaft 6 of the tool 5 is formed as a hollow cylinder which is open on its end face remote from the tool 5 and tapers toward the shaft 6, that is to say has its conical region in the region of the shaft 6. The counter coupling piece 9 has a cone piece 9a which fits the tapering in the coupling extension 8 in a positively engaging manner and is arranged coaxially on the cylindrical region of a cross section that corresponds to the greatest cross section of this conical region 9, so that there is obtained a stepless transition from the cylindrical region to the conical region 9a, which can be seen well in FIG. 6. In the same way, the inner side of the coupling extension 8 is of a stepless design.

In the case of both exemplary embodiments according to FIGS. 6 and 7, the coupling extension 8 and the counter coupling piece 9 can be locked by means of outwardly or radially protruding projections 10 and matching clearances 11 that are open in the axial direction and have undercuts 10a. The clearance 11 intended for locking with the respective projection is arranged at a point of the coupling at which the coupling extension 8 and the coupling counter piece 9 are held together under a reciprocal axial force, and thus pressed together in the coupling position, and the bottom 7 of the container 2 that is adjacent the coupling extension 8 with a seal 12 enclosing the shaft 6 is pressed by a sleeve extension 7a against the drive.

In the exemplary embodiment according to FIG. 6, it can be seen that the counter coupling piece 9 has two radially protruding projections 10 with a cross section which is round in the exemplary embodiment and the coupling extension 8 has as the clearances 11 slits which widen in the direction of insertion, the widening having dimensions that correspond approximately to those of the projection 10 and a constriction 15 that can be overcome in a locking manner being formed ahead of the projection in the direction of insertion due to the undercut 11. The clearances 11 on the coupling extension 8 have run-in slopes 16, which lead to the constrictions 15, so that the coupling movement is facilitated.

In the exemplary embodiment according to FIG. 6, it is provided that, for coupling parts having a cone and a tapering inner opening, two radially protruding projections 10 are provided on the counter coupling piece 9.

FIG. 7 shows an exemplary embodiment in which the coupling extension 8 and the counter coupling piece 9 fit together over their entire effective axial length with constant cross sections and three radially protruding projections 10 can be locked with clearances 11 in the form of slits and openings with the corresponding constrictions 15 during fitting together. Both solutions produce the desired and required static determinacy.

The already mentioned drive, for example an electric motor, is in the exemplary embodiment arranged in a housing 17 and the container 2 and this housing 17 can be detachably connected, in order that the container 2 can be separated completely from the drive.

The connection of the container 2 and the housing 17 is made up of an axial inserting movement and a turning movement, taking place at least over an angular region, so that this inserting movement takes place synchronously with the fitting together of the coupling extension 8 with the counter coupling piece 9. A bayonet closure, the retaining curve 18 of which can be seen in FIG. 2, is provided for the connection between the container 2 and the housing 17.

According to FIGS. 3 and 5, on the container 2 there are arranged adjacent to a rim 19 of its sleeve extension 7a that is at the bottom in the position for use two radially protruding projections 20, matching the retaining curve 18 of the bayonet closure. The retaining curve 18 on the housing 17 of the drive has on its upper side a vertical entry point 21 and a portion running in a sloping manner in the circumferential direction, which forms the main part of this retaining curve 18. The projections 20 fit into the entry point 21 and into the retaining curve 18, that is to say the container 2 and the housing 17 can be initially fitted together approximately in the vertical direction, whereby the projections 20 are introduced into the entry points 21 until they come to lie level with the actual retaining curve 18, after which a relative turning transports these projections 20 into the retaining curve 18 and consequently ends the axial fixing.

Figure 2:
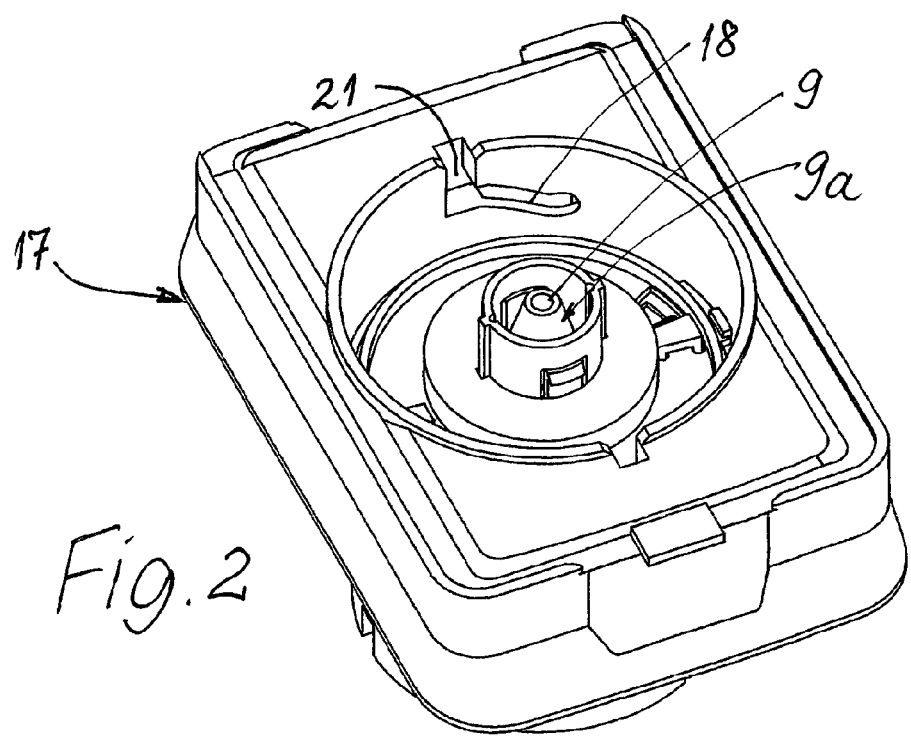
FIG. 2 shows a diagrammatic plan view of the coupling point of the drive and the drive housing after removing the container or before fitting on and coupling the container.

The slope that can be seen in FIG. 2 of the retaining curve 18 of the bayonet closure reaches over a circumferential region and also over a region of the height that corresponds to the engaging movement of the coupling extension 8 on the counter coupling piece 9, that is to say the insertion and further axial movement of the projections 20 with the aid of the retaining curve 18 have the effect at the same time of bringing about or completing the locking of the coupling extension 8 and the counter coupling piece 9 in the sense of a solid coupling connection. The locking is possibly already accomplished by the inserting movement of the projections 20 into the entry points 21, so that the turning and slope of the retaining curve 18 bring about an additional axial retaining force.

In the region of the passage through the shaft 6 for the tool 5, a sealing ring that seals this passage is provided as a seal 12, which sealing ring is acted upon in the axial direction when connecting the container 2 to the housing 17 or even beforehand, in particular by the tool 5, and pressed together during the coupling such that there is the required sealing effect. This sealing ring may consist at least partly of foam material and be formed in a low-friction manner at least on the end face toward the tool 5 and in contact therewith, for example by coating or flocking.

Figure 9:
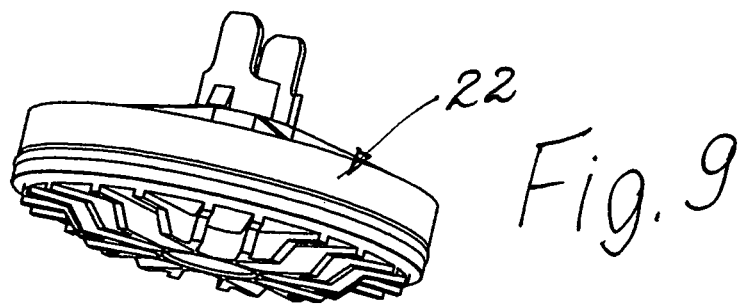
FIG. 9 shows a diagrammatic side view of a plate for bounding the grinding space, which plate fits into the container and thereby into the cover thereof and is roughened on the underside.

In FIGS. 1, 4 and 8 it can also be seen that in the container 2 there is provided above the space receiving the material to be ground and having the tool 5 a plate 22 which bounds or reduces the size of the interior space of the container 2, in the starting position preferably rests on the material to be ground and is shown separately in FIG. 9. At the same time, a stop may be provided for this plate 22 located over or on the material to be ground, limiting the extent to which said plate sinks down in the container. According to FIG. 9, the side of this plate 22 toward the ground material has a profiling or roughening to assist the grinding and comminuting operation.

Since the cover 4 is detachably connected to the lower part 3 of the container 2, this cover 4 can possibly even be reused, if the lower part 3 is to be used only once and disposed of without cleaning the tool 5 and the seal 12.

The device 1 for comminuting or grinding has a container 2 for receiving the material to be ground and a tool 5 which rotates in this container 2 during the processing and also a drive for this tool 5. The container 2 with the tool 5 can be detachably coupled to the drive, that is to say that the container 2 with the tool 5 does not have to be cleaned after a grinding operation, but instead can be replaced by a new such container 2. For this purpose, the tool 5 located in the container 2 is in a position detached or decoupled from the drive or before a corresponding coupling operation is loosely rotatable and, in the position for use, is connected by the coupling to the drive for rotation therewith and centered.

The invention claimed is:

1. A device for comminuting or grinding material to be ground, comprising a container for receiving the material to be ground, a tool which rotates in the container during the comminuting or grinding and a drive for the tool, the container with the tool are together detachably couplable to the drive and the tool is arranged in the container in a position that is detached from the drive or rotatable and, in a position for use, is connected by a coupling to the drive for rotation therewith and so that the tool is centered, a shaft acting on the tool passes outside through a part the container and has a coupling extension which is fittable together in a centering and drivably engaging manner with a counter coupling piece arranged on the drive for rotation therewith, and the coupling extension and the counter coupling piece are lockable by outwardly or radially protruding projections and matching clearances that are open in an axial direction and have undercuts, and the clearance intended for locking with the respective projection is arranged at a point of the coupling at which the coupling extension and the counter coupling piece are held together under a reciprocal axial force and a part of the coupling that is adjacent the coupling extension, is pressed against a seal enclosing the shaft.

2. The device as claimed in claim 1, wherein the coupling extension has a cylindrical region and a conical region and the counter coupling piece has a cylindrical region and a conical region, and in the position for use, an outer cone formed by the conical region of one of the coupling extension or the counter coupling piece and an inner cone of the other of the coupling extension or the counter coupling piece contact one another, at least over part of a circumferences thereof.

3. The device as claimed in claim 2, wherein the coupling extension on the shaft of the tool is formed as a hollow cylinder which is open on an end face thereof remote from the tool and tapers toward the shaft, and the counter coupling piece has a conical region which fits the tapering in the coupling extension and is arranged coaxially on a cylindrical region of a cross section that corresponds approximately to a greatest cross section of the conical region.

4. The device as claimed in claim 1, wherein the counter coupling piece has at least two radially protruding projections and the coupling extension has slits which widen in a direction of insertion to form a widening having dimensions that correspond approximately to one of the projections and a constriction that can be overcome in a locking manner being arranged ahead of the projection in the direction of insertion.

5. The device as claimed in claim 4, wherein the clearances on the coupling extension have sides which are sloped inwardly starting from an outside end toward the constriction.

6. The device as claimed in claim 1, wherein for the coupling extension and the counter coupling piece having a cone and a tapering inner opening, two radially protruding projections are provided on the counter coupling piece.

7. The device as claimed in claim 6, wherein the coupling extension and the counter coupling piece fit together over an entire effective length with constant cross sections and three radially protruding projections can be locked with clearances during fitting together.

8. The device as claimed in claim 1, wherein the drive is arranged in a housing and the container and the housing are detachably connectable.

9. The device as claimed in claim 8, wherein in the region of a passage through the shaft for the tool, a sealing ring acting on and enclosing the passage is provided as a seal, said sealing ring can be acted upon in at least one of an axial direction or pressed together when connecting the container to the housing of the drive.

10. The device as claimed in claim 9, wherein the sealing ring is formed at least partly of foam material and is formed in a low-friction manner on at least one end face or on an end face toward the tool.

11. The device as claimed in claim 8, wherein a bayonet closure is provided for the connection between the container and the housing.

12. The device as claimed in claim 11, wherein on the container there is arranged adjacent to a rim that is at a bottom in the position for use at least one radially protruding projection, matching a retaining curve of the bayonet closure, and the retaining curve on the housing of the drive has a vertical entry point and a portion running particularly in a sloping manner in a circumferential direction.

13. The device as claimed in claim 12, wherein a slope of the retaining curve of the bayonet closer runs over a circumferential region and thereby over a region of a height that corresponds to the engaging movement of the coupling extension on the counter coupling piece.

14. The device as claimed in claim 1, wherein in the container there is provided above a space receiving the material to be ground and having the tool a plate which bounds an interior space of the container and in a starting position is adapted to rest on the material to be ground.

15. The device as claimed in claim 14, wherein a stop is provided for the plate located over or on the material to be ground, limiting an extent to which said plate sinks down.

16. The device as claimed in claim 15, wherein a side of the plate toward the material to be ground has profilings or roughenings or similar deformations to assist the grinding or comminuting operation.

* * * * *